(12) United States Patent
Wu et al.

(10) Patent No.: US 11,630,034 B2
(45) Date of Patent: Apr. 18, 2023

(54) METHOD FOR DIAGNOSING AND PREDICTING OPERATION CONDITIONS OF LARGE-SCALE EQUIPMENT BASED ON FEATURE FUSION AND CONVERSION

(71) Applicant: Sichuan University, Chengdu (CN)

(72) Inventors: Jianbo Wu, Chengdu (CN); Ziheng Huang, Chengdu (CN); Zhaoyuan Xu, Chengdu (CN); Qiao Qiu, Chengdu (CN); Jun Zheng, Chengdu (CN); Jinhang Li, Chengdu (CN); Zhiyuan Shi, Chengdu (CN)

(73) Assignee: Sichuan University, Chengdu (CN)

( * ) Notice: Subject to any disclaimer, the term of this patent is extended or adjusted under 35 U.S.C. 154(b) by 0 days.

(21) Appl. No.: 17/866,441

(22) Filed: Jul. 15, 2022

(65) Prior Publication Data

US 2022/0373432 A1    Nov. 24, 2022

(30) Foreign Application Priority Data

Dec. 29, 2021  (CN) .......................... 202111650997.1

(51) Int. Cl.
*G01M 99/00* (2011.01)
*G05B 19/04* (2006.01)
(Continued)

(52) U.S. Cl.
CPC .......... *G01M 99/005* (2013.01); *G05B 19/04* (2013.01); *G05B 19/418* (2013.01);
(Continued)

(58) Field of Classification Search
CPC ... G01M 99/005; G05B 19/04; G05B 19/418; G05B 23/0259
See application file for complete search history.

(56) References Cited

U.S. PATENT DOCUMENTS 9,483,049 B2 * 11/2016 Maeda ............... G06K 9/00536
2019/0080253 A1 * 3/2019 Lokare .................. G06N 3/08
(Continued)

FOREIGN PATENT DOCUMENTS

| CN | 101221066 A | 7/2008 |
| CN | 102279084 A | 12/2011 |

(Continued)

OTHER PUBLICATIONS

H. Ma, X. Yang, J. Mao and H. Zheng, "The Energy Efficiency Prediction Method Based on Gradient Boosting Regression Tree," 2018 2nd IEEE Conference on Energy Internet and Energy System Integration (EI2), 2018, pp. 1-9, doi: 10.1109/EI2.2018.8581904 (Year: 2018).*

(Continued)

*Primary Examiner* — Kyle R Quigley
*Assistant Examiner* — Aeysha N Sultana

(57) ABSTRACT

A method for diagnosing and predicting operation conditions of large-scale equipment based on feature fusion and conversion, including: collecting a vibration signal of each operating condition of the equipment, and establishing an original vibration acceleration data set of the vibration signal; performing noise reduction on the original vibration acceleration data set, and calculating a time domain parameter; performing EMD on a de-noised vibration acceleration and calculating a frequency domain parameter; constructing a training sample data set through the time domain parameter and the frequency domain parameter; establishing a GBDT model, and inputting the training sample data set into the GBDT model; extracting a leaf node number set from a trained GBDT model; performing one-hot encoding on the leaf node number set to obtain a sparse matrix; and inputting the sparse matrix into a factorization machine to obtain a prediction result.

6 Claims, 4 Drawing Sheets

(51) Int. Cl.
  *G05B 19/418*  (2006.01)
  *G05B 23/02*  (2006.01)
  *G06F 18/25*  (2023.01)
  *G06F 18/214*  (2023.01)

(52) U.S. Cl.
  CPC ..... *G05B 23/0259* (2013.01); *G06F 18/2148* (2023.01); *G06F 18/253* (2023.01); *G06F 2218/04* (2023.01); *G06F 2218/10* (2023.01); *G06F 2218/12* (2023.01)

(56) References Cited

U.S. PATENT DOCUMENTS

| | | |
|---|---|---|
| 2019/0095781 A1 | 3/2019 | Vedula |
| 2019/0195727 A1 | 6/2019 | Jiang et al. |
| 2020/0200648 A1 | 6/2020 | Zhang et al. |

FOREIGN PATENT DOCUMENTS

| | | |
|---|---|---|
| CN | 105509771 A | 4/2016 |
| CN | 105891707 A | 8/2016 |
| CN | 108413921 A | 8/2018 |
| CN | 108475393 A | 8/2018 |
| CN | 108734192 A | 11/2018 |
| CN | 109187025 A | 1/2019 |
| CN | 109299976 A | 2/2019 |
| CN | 109489800 A | 3/2019 |
| CN | 110175508 A | 8/2019 |
| CN | 110426191 A | 11/2019 |
| CN | 110543860 A | 12/2019 |
| CN | 111242171 A | 6/2020 |
| CN | 111626153 A | 9/2020 |
| CN | 112304613 A | 2/2021 |
| CN | 113138011 A | 7/2021 |
| CN | 113343078 A | 9/2021 |
| CN | 113390631 A | 9/2021 |
| CN | 113723496 A | 11/2021 |

OTHER PUBLICATIONS

Wang Chaohai, et al., "Research on Fault Diagnosis of Rolling Bearing Based on Empirical Mode Decomposition and Principal Component Analysis", Acta Metrologica Sinica, 2019, vol. 40, No. 6, pp. 1077-1082, Nov. 2019.

Guolin Ke et al., "DeepGBM: A Deep Learning Framework Distilled by GBDT for Online Prediction Tasks", The 25th ACM SIGKDD International Conference, pp. 384-394, KDD '19, Aug. 4-8, 2019, Anchorage, AK, USA.

Wu Dinghui ra al., "Fault diagnosis of wind turbine bearing based on multi-feature fusion and XGBoost".Transducer and Microsystem Technologies, vol. 39, Issue 7, 2020 145-149.

Shu Chang et al., "Fault Diagnosis of UAV Sensors Based on Wavelet and GDBT", Measurement & Control Technology,Issue 8, 2017, pp. 41-46.

Cheng Gang et al., "Study on Planetary Gear Fault Diagnosis Based on Entropy Feature Fusion of Ensemble Empirical Mode Decomposition". vol. 91, Sep. 2016, pp. 140-154.

Fu Xiaoqiang et al., "Eliminating Trend for Vertical Shaft Blasting Signal and the Method of De-noising", Journal of Lanzhou Institute of Technology, vol. 27 No. 1, Feb. 2020, pp. 57-62.

* cited by examiner

METHOD FOR DIAGNOSING AND PREDICTING OPERATION CONDITIONS OF LARGE-SCALE EQUIPMENT BASED ON FEATURE FUSION AND CONVERSION

CROSS-REFERENCE TO RELATED APPLICATIONS

This application claims the benefit of priority from Chinese Patent Application No. 202111650997.1, filed on Dec. 29, 2021. The content of the aforementioned application, including any intervening amendments thereto, is incorporated herein by reference in its entirety.

TECHNICAL FIELD

This application relates to fault diagnosis and prediction of large-scale equipment, and more specifically to a method for diagnosing and predicting operation conditions of large-scale equipment based on feature fusion and conversion.

BACKGROUND

Large-scale complex equipment is characterized by high dimensions, nonlinearity, and great difficulty in identifying early failures. Due to the long-term exposure to complex and harsh working environment, the large-scale mechanical equipment generally suffers serious aging and frequent failures. In order to ensure efficient and regular operation and make full use of the large-scale equipment, an effective fault detection and diagnosis method is required. In view of this, the condition assessment and fault prediction for larger-scale equipment have brilliant application prospect.

With regard to the large-scale equipment, the maintenance strategy is gradually transitioning from corrective maintenance to predictive maintenance. The predictive maintenance mainly involves condition monitoring, fault diagnosis, condition prediction and maintenance decision. Regarding the condition monitoring, different types of sensors, such as temperature, pressure, vibration, and ultrasonic sensors, are used to obtain various operating status information of equipment, among them, the vibration sensors are widely used to determine whether the mechanical equipment is in non-stationary motion. With the help of the collaboration and functional complementation between multiple kinds of sensors, more accurate condition monitoring is enabled. The fault diagnosis is performed often by time domain signal diagnosis and frequency domain signal diagnosis.

In view of the massive data generated by the condition monitoring of the large-scale equipment, the traditional manual data classification and screening is greatly limited by low efficiency and poor visualization degree. Moreover, with respect to the wind turbine, its condition monitoring data have characteristics of high dimension, multiple features and large noise, and thus it is necessary to find a reasonable method to minimize the loss of information contained in the original indicators while eliminating irrelevant factors, so as to comprehensively analyze the collected data. The data-driven diagnosis method can reduce the dependence on the physical model, and automatically explore the characteristics of historical data to effectively diagnose and predict the operation conditions and faults.

SUMMARY

An object of the present disclosure is to provide a method for diagnosing and predicting operation conditions of large-scale equipment based on feature fusion and conversion to solve the problems of large noise and low fault resolution in the prior art.

The technical solutions of the present disclosure are described as follows.

This application provides a method for diagnosing and predicting operation conditions of large-scale equipment based on feature fusion and conversion, comprising:

(S1) collecting a vibration signal of individual operating conditions of the large-scale equipment, and establishing an original vibration acceleration data set of the vibration signal;

(S2) performing noise reduction on the original vibration acceleration data set to obtain a de-noised vibration acceleration;

(S3) calculating a time domain parameter based on the de-noised vibration acceleration;

(S4) performing empirical mode decomposition (EMD) on the de-noised vibration acceleration to obtain a plurality of components;

(S5) calculating a frequency domain parameter based on the plurality of components;

(S6) constructing a training sample data set based on the time domain parameter and the frequency domain parameter;

(S7) establishing a gradient boosting decision tree (GBDT) model, and inputting the training sample data set into the GBDT model for training to obtain a trained GBDT model;

(S8) extracting a leaf node number set from the trained GBDT model;

(S9) performing one-hot encoding on the leaf node number set to obtain a sparse matrix; and (S10) inputting the sparse matrix into a factorization machine to obtain a prediction result.

In an embodiment, the step (S2) is performed through steps of:

(S2-1) removing a direct-current (DC) component of a $h^{th}$ original vibration acceleration $g_{h(i)}$ in the original vibration acceleration data set according to formula (1) to obtain a $h^{th}$ first vibration acceleration $g'_{h(i)}$ with the DC component removed:

$$g'_{h(i)} = g_{h(i)} + \frac{\sum_{i=1}^{n} g_{h(i)}}{n}; \quad (1)$$

wherein n is a data length of the $h^{th}$ original vibration acceleration; and (S2-2) removing a trend of the $h^{th}$ first vibration acceleration according to formulas (2)-(4) to obtain a $h^{th}$ de-noised vibration acceleration:

$$g''_{h(i)} = g'_{h(i)} - z; \quad (2)$$

$$z = \alpha' + \beta' t; \quad (3)$$

$$(\alpha', \beta') = \arg\min_{(\alpha,\beta)} \left[ \sum_{i=1}^{n} (\alpha + \beta t - g'_{h(i)})^2 \right]; \quad (4)$$

wherein z is the fitting trend linear function when $\alpha = \alpha'$ and $\beta = \beta'$; $\alpha$ and $\beta$ are parameters of a fitting trend linear function; $(\alpha', \alpha')$ represents values of $\alpha$ and $\beta$ corresponding to a minimum value of $$\sum_{i=1}^{n}(\alpha + \beta t - g'_{h(i)})^2;$$

arg min[•] indicates minimization operation; and t represents time within a range of one sample;

a sampling time t corresponding to the $h^{th}$ de-noised vibration acceleration is expressed as:

$$t_i = e + f \times i \quad i \leq n \quad (5)$$

wherein e is an origin time of vibration acceleration; and f is a sampling frequency.

In an embodiment, in step (S3), the time domain parameter comprises an effective value, kurtosis, variance and crest factor of the de-noised vibration acceleration.

In an embodiment, the step (S4) is performed through steps of:

(S4-1) finding all extreme points of the de-noised vibration acceleration through a find_peaks function; wherein the find_peaks function is configured to find peaks;

(S4-2) connecting local maximum points $m_{up}$ in all extreme points into an upper envelope $n_{up}$, and connecting local minimum points $m_{down}$ in all the extreme points into a lower envelope $n_{down}$ through a cubic spline curve, expressed as follows:

$$n_{up} = a_{up} + b_{up} m_{up} + c_{up} m_{up}^2 + d_{up} m_{up}^3 \quad up \leq n$$

$$n_{down} = a_{down} + b_{down} m_{down} + c_{down} m_{down}^2 + d_{down} m_{down}^3 \quad down \leq n \quad (14)$$

wherein $a_{up}$, $b_{up}$, $c_{up}$ and $d_{up}$, are coefficients of the upper envelope; and $a_{down}$, $b_{down}$, $c_{down}$ and $d_{down}$ are coefficients of the lower envelope;

(S4-3) determining the coefficients of the upper envelope and the coefficients of the lower envelope based on all extreme points of the de-noised vibration acceleration through an interpolation algorithm;

(S4-4) obtaining a component to be judged $h_1(t^*)$ at moment $t^*$ according to formula (15):

$$m_1(t^*) = \frac{n_{up} + n_{down}}{2} \quad (15)$$

$$h_1(t^*) = g''_h(t^*) - m_1(t^*);$$

wherein $m_1(t^*)$ is an average value of the upper envelope and the lower envelope at the moment $t^*$; and $g''_h(t^*)$ is a time domain expression of a $h^{th}$ de-noised vibration acceleration;

(S4-5) determining whether $h_1(t^*)$ satisfies an intrinsic mode function;

if yes, taking $h_1(t^*)$ as a first component of the $h^{th}$ de-noised vibration acceleration, and proceeding to step (S4-6);

otherwise, taking $h_1(t^*)$ as an input signal, and repeating steps (S4-1)-(S4-5) until $h_1(t^*)$ satisfies the intrinsic mode function, and proceeding to step (S4-6);

(S4-6) obtaining a total set of remaining signals after a first decomposition according to formula (16):

$$R_1(t^*) = g''_h(t^*) - h_1(t^*) \quad (16)$$

(S4-7) repeating steps (S4-1)-(S4-6) based on the total set of remaining signals to obtain the $k^{th}$ component $h_k(t^*)$.

In an embodiment, the step (S5) is performed through steps of:

(S5-1) obtaining an energy value $P_k$ of a $k^{th}$ component according to formula (6):

$$P_k = \sum_{i_1=1}^{N_1} h_k^2(t^*) \times dT; \quad (6)$$

wherein $N_1$ is the total number of discrete data points in the $k^{th}$ component $h_k(t^*)$; dT represents a sampling frequency; and $i_1$ represents a serial number of the discrete data points in the $k^{th}$ component $h_k(t^*)$;

(S5-2) sorting energy values of the plurality of components;

selecting X components with the largest energy value; and subjecting the X components to fast Fourier transform to obtain X initial spectra;

(S5-3) extracting a maximum amplitude $P_0^X$ of each of the X initial spectra;

(S5-4) setting a threshold; and selecting frequencies respectively corresponding to an amplitude higher than the threshold to establish X frequency-amplitude data sets;

(S5-5) calculating an average amplitude $P_1^X$ of the X frequency-amplitude data sets according to formula (7):

$$P_1^X = \frac{\sum_{k_2=1}^{N_2} |f_{i_2}|}{N_2} \quad N_2 \leq N_1; \quad (7)$$

wherein $N_2$ is the number of selected frequencies; and $f_{i_2}$ is an amplitude corresponding to a $i_2^{th}$ frequency;

(S5-6) calculating a root mean square value $P_2^X$ of the X frequency-amplitude data sets according to formula (8):

$$P_2^X = \sqrt{\frac{\sum_{k_2=1}^{N_2} |f_{i_2}^2|}{4\pi^2 f_{i_2}^2}}; \quad (8)$$

wherein π represents a 180-degree angle; and (S5-7) selecting a frequency $P_3^X$ corresponding to a maximum amplitude in the X frequency-amplitude data sets.

In an embodiment, the step (S6) is performed through steps of:

(S6-1) combining the frequency domain parameter into a frequency-domain feature real number set $x_2^h = \{P_0^X, P_1^X, P_2^X, P_3^X\}_h$, and forming an integrated feature real number set $x_h = \{x_1^h, x_2^h\}$ in combination with the time domain parameter; wherein h is a $h^{th}$ data in the original vibration acceleration data set; and $x_1^h$ is a time domain feature real number set; and (S6-2) tagging the integrated feature real number set to obtain the training sample data set D expressed as: D={$(x_1, y_1), (x_2, y_2), \ldots (x_q, y_q)$};

wherein q represents the total amount of data in the original vibration acceleration data set; $y_q$ is a tagged value, and $y_q \in \{0,1\}$; $y_q=0$ indicates that data in the integrated feature real number set is in a normal operating state; and $y_q=1$ indicates that the data in the integrated feature real number set is in an abnormal operating state.

In an embodiment, in step (S7), the GBDT model is established through steps of:

(S7-1) initializing a first weak learner $G_0(D)$ according to formula (9):

$$G_0(D) = \log \frac{P(y_h = 0|D)}{1 - P(y_h = 0|D)} \quad h \in \{1, \ldots, q\}; \qquad (9)$$

wherein $P(y_h=0|D)$ represents a probability that a $h^{th}$ tagged value $y_h$ in the training sample data set D is marked as 0 in the integrated feature real number set; and log is a base-10 logarithmic function;

(S7-2) establishing S trees, and calculating a pseudo-residual $rss_{s,h}$ of a $s^{th}$ tree $G'_s(x_h)$ by using a log-likelihood function, expressed as:

$$rss_{s,h} = y_h - \frac{1}{1 + e^{-G_0(x_k)}} \quad s \in \{0, 1, \ldots S-1\}; \qquad (10)$$

wherein $x_h$ is a $h^{th}$ integrated feature real number in the training sample data set D; and e represents natural logarithm;

(S7-3) fitting data $(x_h, rss_{s,h})$ using a classification and regression tree (Cart) to obtain a $s^{th}$ regression tree $G_s(x_h)$ as a $s^{th}$ weak learner;

(S7-4) calculating an optimal negative gradient fitted value $c_{s,ks}$ of each leaf node in the $s^{th}$ regression tree according to formula (11):

$$c_{s,k} = \left| \frac{\sum_{x_k \in R_{s,ks}} rss_{s,h}}{\sum_{x_j \in R_{s,ks}} (y_h - rss_{s,h})(1 - y_h + rss_{s,h})} \right|; \qquad (11)$$

wherein $R_{s,\,ks}$ is a leaf node region of the $s^{th}$ regression tree; and ks represents a $k^{th}$ leaf node of the $s^{th}$ regression tree;

(S7-5) updating a strong learner $G_{s+1}(x_h)$ according to formula (12):

$$G_{z+1}(x_h) = G_z(x_h) + \sum_{ks=1}^{K_s} c_{z,ks} I(x_h \in R_{z,ks}); \qquad (12)$$

wherein $I(\cdot)$ is a weighted count of $x_h$ within the leaf node region; and $K_s$ is the total number of leaf nodes of the $s^{th}$ regression tree; and (S7-6) obtaining a final strong learner $G_{s+1}'(x_h)$ as the trained GBDT model based on an output $c_{s+1,ks}$ of an updated strong learner according to formula (13):

$$G'_{s+1}(x_k) = G_0(x_h) + \sum_{s=2}^{s} \sum_{k=1}^{K_s} c_{s-1,k} I(x \in R_{s,ks}). \qquad (13)$$

In an embodiment, the step (S8) is performed through steps of:

extracting the leaf node number set T output by the trained GBDT model according to formula (16):

$$T = \begin{bmatrix} l_{(1,1)} & \cdots & l_{(1,s)} \\ \vdots & \ddots & \vdots \\ l_{(q,1)} & \cdots & l_{(q,s)} \end{bmatrix}_{a,S}; \qquad (16)$$

wherein the leaf node number set T has a size of q×S; $l_{(q,s)}$ represents a serial number of a leaf node on the $s^{th}$ regression tree where an output feature of a $q^{th}$ training sample after being trained; q is the total number of training samples; and S is the total number of regression trees.

In an embodiment, the step (S9) is performed through steps of:

(S9-1) performing one-hot encoding conversion on the leaf node number set T;

marking a leaf node where an output of a regression tree corresponding to a tree formed by each training sample in the training sample data set is located as 1, and marking remaining leaf nodes as 0 to obtain a sub-matrix; and (S9-2) subjecting each training sample to sub-matrix transformation followed by combining into the sparse matrix with a size of (S×$K_s$,q); wherein S is the total number of regression trees; $K_s$ is the total number of leaf nodes on the $s^{th}$ regression tree corresponding to the tree formed by each training sample; and q is the total number of training samples.

In an embodiment, the step (S10) is performed through steps of:

(S10-1) based on decomposability of a real symmetric positive definite matrix, factorizing the sparse matrix to calculate a feature latent vector of the sparse matrix;

(S10-2) obtaining a second-order polynomial model $\hat{y}(x)$ formed by combination of a linear model and a cross term according to formula (17):

$$\hat{y}(x) = \omega_0 + \sum_{u=1}^{S \times K_s} w_u x_u + \sum_{v=1}^{S \times K_s} \sum_{u=v=1}^{S \times K_s} \langle V_u, V_v \rangle x_u x_v \qquad (17)$$

$$\langle V_u, V_v \rangle = \sum_{l}^{d} v_{u,i} \times v_{v,i};$$

wherein $\omega_0$, is a bias term of the linear model; $w_u$ is a weight of a $u^{th}$ feature in the sparse matrix; $x_u$ is the $u^{th}$ feature in the sparse matrix; $x_v$ is a $v^{th}$ feature of the sparse matrix; $\langle V_u, V_v \rangle$ indicates conversion of a coefficient of the cross term into a latent vector inner product; $V_u$ is a feature latent vector of the $u^{th}$ feature of the sparse matrix; $V_v$ is a feature latent vector of the $v^{th}$ feature of the sparse matrix; $V_{u,l}$ is a $l^{th}$ element obtained from decomposition of the $u^{th}$ feature; and $V_{v,l}$ is a $l^{th}$ element obtained from decomposition of the $v^{th}$ feature; and (S10-3) optimizing the second-order polynomial model according to back propagation of a Hinge loss function in the factorization machine to obtain a prediction result.

Compared to the prior art, the present disclosure has the following beneficial effects.

1. Regarding the method provided herein, time domain features and frequency domain features are combined, so that the physical characteristics of original signals can be directly reflected, and the initial feature fusion can also be fully utilized to obtain reliable signal data.

2. Empirical mode decomposition (EMD) is adopted to de-noise and decompose the signal after the frequency domain conversion, and the selected frequency domain feature parameters can effectively represent the characteristics of the original signals and further relieve the noise interference while retaining the characteristics of original signals, so as to prepare for the next algorithm processing.

3. The diagnostic model involves the combination of a gradient boosting decision tree (GBDT) and a factorization machine, where by means of the GBDT, effective features can be found to obtain a local optimal solution; based on the ultra-high dimensional sparse characteristic of the factorization machine, the GBDT model is trained to obtain a global optimal solution. The combination of the two allows a higher fault resolution without manual feature selection.

DETAILED DESCRIPTION OF EMBODIMENTS

The disclosure will be described completely and clearly below with reference to the accompanying drawings and embodiments to make the object, technical solutions, and beneficial effects of the present disclosure clearer. Obviously, provided below are merely some embodiments of the disclosure, which are not intended to limit the disclosure. It should be understood that all other embodiments obtained by those skilled in the art based on the content disclosed herein without paying any creative effort should fall within the scope of the present disclosure.

Figure 1:
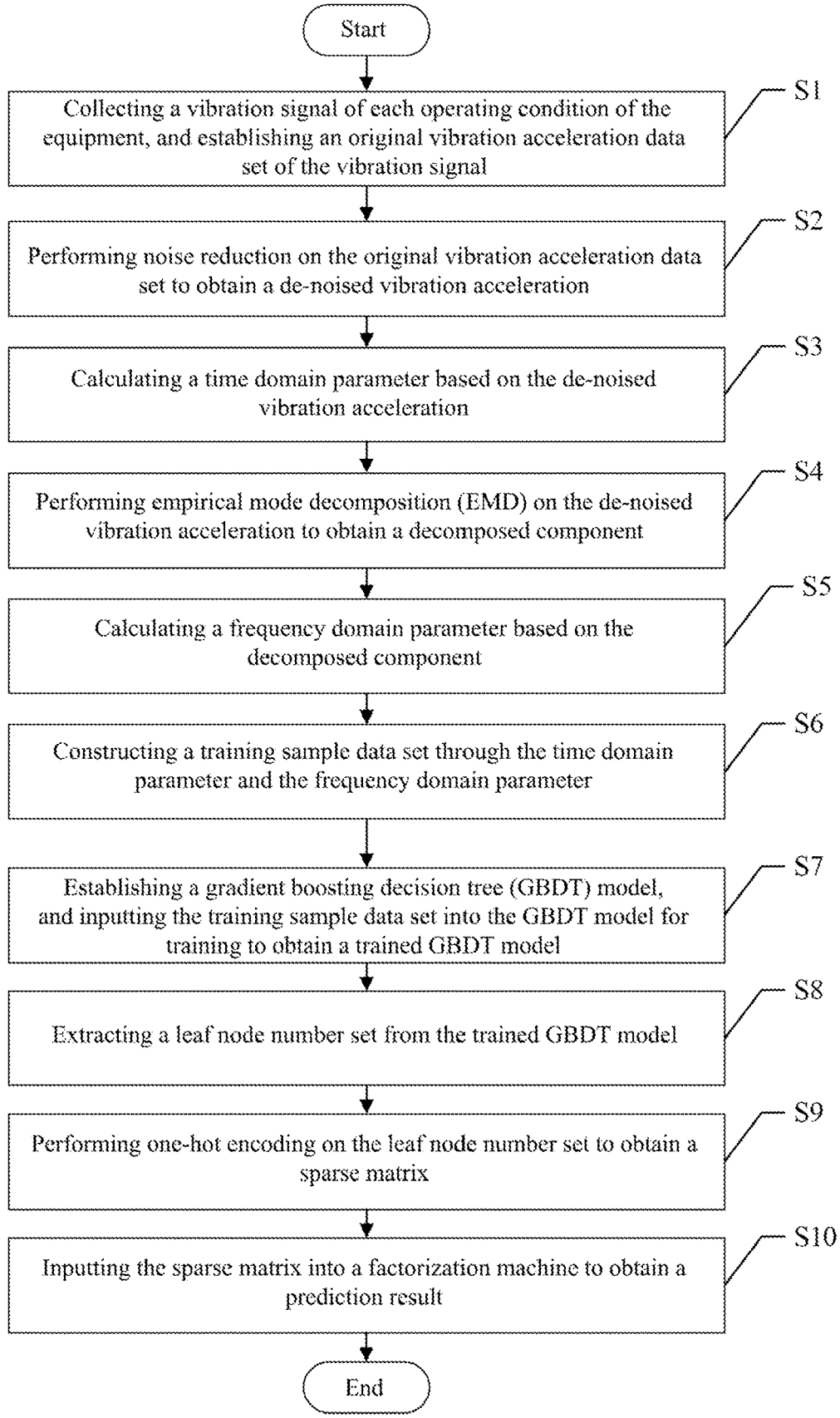
FIG. 1 is a flow chart of a method for diagnosing and predicting operation conditions of large-scale equipment based on feature fusion and conversion according to an embodiment of the present disclosure.

Illustrated in FIG. 1 is a method for diagnosing and predicting operation conditions of large-scale equipment based on feature fusion and conversion, which is performed through the following steps.

(S1) A vibration signal of individual operating conditions of the large-scale equipment is collected, and an original vibration acceleration data set of the vibration signal is established.

(S2) Noise reduction is performed on the original vibration acceleration data set to obtain a de-noised vibration acceleration.

(S3) A time domain parameter based on the de-noised vibration acceleration is calculated.

(S4) Empirical mode decomposition (EMD) is performed on the de-noised vibration acceleration to obtain a plurality of components.

(S5) A frequency domain parameter based on the plurality of components is calculated.

(S6) A training sample data set based on the time domain parameter and the frequency domain parameter is constructed.

(S7) A gradient boosting decision tree (GBDT) model is established, and the training sample data set is input into the GBDT model for training to obtain a trained GBDT model.

(S8) A leaf node number set is extracted from the trained GBDT model.

(S9) One-hot encoding is performed on the leaf node number set to obtain a sparse matrix.

(S10) The sparse matrix is input into a factorization machine to obtain a prediction result.

The step (S2) is performed through the following steps.

(S2-1) A direct-current (DC) component of a $h^{th}$ original vibration acceleration $g_{h(i)}$ in the original vibration acceleration data set is removed according to formula (1) to obtain a $h^{th}$ first vibration acceleration $g'_{h(i)}$ with the DC component removed:

$$g'_{h(i)} = g_{h(i)} + \frac{\sum_{i=1}^{n} g_{h(i)}}{n}; \tag{1}$$

where n is a data length of the $h^{th}$ original vibration acceleration.

(S2-2) A trend of the $h^{th}$ first vibration acceleration is removed according to formulas (2)-(4) to obtain a $h^{th}$ de-noised vibration acceleration:

$$g''_{h(i)} = g'_{h(i)} - z; \tag{2}$$

$$z = \alpha' + \beta' t; \text{ and} \tag{3}$$

$$(\alpha', \beta') = \arg\min_{(\alpha,\beta)} \left[ \sum_{i=1}^{n} (\alpha + \beta t - g'_{h(i)})^2 \right]; \tag{4}$$

where z is the fitting trend linear function when $\alpha=\alpha'$ and $\beta=\beta'$; $\alpha$ and $\beta$ are parameters of a fitting trend linear function; $(\alpha',\beta')$ represents values of $\alpha$ and $\beta$ corresponding to a minimum value of $$\sum_{i=1}^{n} (\alpha + \beta t - g'_{h(i)})^2;$$

arg min[•] indicates minimization operation; and t represents time within a range of one sample.

A sampling time $t_i$ corresponding to the $h^{th}$ de-noised vibration acceleration is expressed as:

$$t_i = e + f \times i \quad i \leq n \tag{5}$$

where e is an origin time of vibration acceleration; and f is a sampling frequency.

In step (S3), the time domain parameter includes an effective value, kurtosis, variance and crest factor of the de-noised vibration acceleration.

The step (S4) is performed through the following steps.

(S4-1) All extreme points of the de-noised vibration acceleration are found through a find_peaks function. The find_peaks function is configured to find peaks.

(S4-2) Local maximum points $m_{up}$ in all extreme points are connected into an upper envelope $n_{up}$, and local minimum points $m_{down}$ in all the extreme points are connected into a lower envelope $n_{down}$ through a cubic spline curve, expressed as follows:

$$n_{up} = a_{up} + b_{up}m_{up} + c_{up}m_{up}^2 + d_{up}m_{up}^3 \quad up \le n$$

$$n_{down} = a_{down} + b_{down}m_{down} + c_{down}m_{down}^2 + d_{down}m_{down}^3 \quad down \le n \quad (14)$$

where $a_{up}$, $b_{up}$, $c_{up}$ and $d_{up}$, are coefficients of the upper envelope; and $a_{down}$, $b_{down}$, $c_{down}$ and $d_{down}$ are coefficients of the lower envelope.

(S4-3) The coefficients of the upper envelope and the coefficients of the lower envelope based on all extreme points of the de-noised vibration acceleration are determined through an interpolation algorithm.

(S4-4) A component to be judged $h_1(t^*)$ at a moment $t^*$ is obtained according to formula (15):

$$m_1(t^*) = \frac{n_{up} + n_{down}}{2} \quad (15)$$

$$h_1(t^*) = g_h''(t^*) - m_1(t^*);$$

where $m_1(t^*)$ is an average value of the upper envelope and the lower envelope at the moment $t^*$; and $g''_h(t^*)$ is a time domain expression of a $h^{th}$ de-noised vibration acceleration.

(S4-5) Whether $h_1(t^*)$ satisfies an intrinsic mode function is determined.

If yes, $h_1(t^*)$ is taken as a first component of the $h^{th}$ de-noised vibration acceleration, and step (S4-6) is performed.

Otherwise, $h^1(t^*)$ is taken as an input signal, and steps (S4-1)-(S4-5) are repeated until $h_1(t^*)$ satisfies the intrinsic mode function, and step (S4-6) is performed.

(S4-6) A total set $R_1(t^*)$ of remaining signals after a first decomposition is obtained according to formula (16):

$$R_1(t^*) = g''_h(t^*) \quad (16)$$

(S4-7) Steps (S4-1)-(S4-6) are repeated based on the total set of remaining signals to obtain the $k^{th}$ component $h_k(t^*)$.

The step (S5) is performed through the following steps.

(S5-1) An energy value $P_k$ of a $k^{th}$ component is obtained according to formula (6):

$$P_k = \sum_{i_1=1}^{N_1} h_k^2(t^*) \times dT; \quad (6)$$

where $N_1$ is the total number of discrete data points in the $k^{th}$ component $h_k(t^*)$; dT represents a sampling frequency; and $i_1$ represents a serial number of the discrete data points in the $k^{th}$ component $h_k(t^*)$.

(S5-2) Energy values of the plurality of components are sorted. X components with the largest energy value are selected. The X components are subjected to fast Fourier transform to obtain X initial spectra.

(S5-3) A maximum amplitude $P_0^X$ of each of the X initial spectra is extracted.

(S5-4) A threshold is set. Frequencies respectively corresponding to an amplitude higher than the threshold is selected to establish X frequency-amplitude data sets.

(S5-5) An average amplitude $P_1^X$ of the X frequency-amplitude data sets is calculated according to formula (7):

$$P_1^X = \frac{\sum_{i_2=1}^{N_2} |f_{i_2}|}{N_2} \quad N_2 \le N_1; \quad (7)$$

where $N_2$ is the number of selected frequencies; and $f_{i_2}$ is an amplitude corresponding to a $i_2^{th}$ frequency.

(S5-6) A root mean square value $P_2^X$ of the X frequency-amplitude data sets is calculated according to formula (8):

$$P_2^X = \sqrt{\frac{\sum_{i_2=1}^{N_2} |f_{i_2}^2|}{4\pi^2 f_{i_2}^2}}; \quad (8)$$

where $\pi$ represents a 180-degree angle.

(S5-7) A frequency $P_3^x$ corresponding to a maximum amplitude in the X frequency-amplitude data sets is selected.

The step (S6) is performed through the following steps.

(S6-1) Frequency domain parameters are combined into a frequency-domain feature real number set $x_2^h = \{P_0^X, P_1^X, P_2^X, P_3^X\}_h$, and an integrated feature real number set $x_h = \{x_1^h, x_2^h\}$ is formed in combination with the time domain parameters; where h is a $h^{th}$ data in the original vibration acceleration data set; and $x_1^h$ is a time domain feature real number set.

(S6-2) The integrated feature real number set is tagged to obtain the training sample data set D expressed as: D={$(x_1, y_1), (x_2, y_2), \ldots (x_q, y_q)$};

where q represents the total amount of data in the original vibration acceleration data set; $y_q$ is a tagged value, and $y_q \in \{0,1\}$; $y_q = 0$ indicates that data in the integrated feature real number set is in a normal operating state; and $y_q = 1$ indicates that the data in the integrated feature real number set is in an abnormal operating state.

In step (S7), the GBDT model is established through the following steps.

(S7-1) A first weak learner $G_0(D)$ is initialized according to formula (9):

$$G_0(D) = \log \frac{P(y_h = 0 | D)}{1 - P(y_k = 0 | D)} \quad h \in \{1, \ldots, q\}; \quad (9)$$

where $P(y_h=0|D)$ represents a probability that a $h^{th}$ tagged value $y_h$ in the training sample data set D is marked as 0 in the integrated feature real number set; and log is a base-10 logarithmic function.

(S7-2) S trees are established. A pseudo-residual $rss_{s,h}$ of a $s^{th}$ tree $G'_s(x_h)$ is calculated by using a log-likelihood function, expressed as:

$$rss_{z,h} = y_h - \frac{1}{1 + e^{-G'_z(x_k)}} \quad s \in \{0, 1, \ldots S-1\}. \quad (10)$$

$x_h$ is a $h^{th}$ integrated feature real number in the training sample data set D; and e represents natural logarithm.

(S7-3) Data $(x_h, rss_{s,h})$ is fit by using a classification and regression tree (Cart) to obtain a $s^{th}$ regression tree $G_s(x_h)$ as a $s^{th}$ weak learner.

(S7-4) An optimal negative gradient fitted value $c_{s,ks}$ of each leaf node in the $s^{th}$ regression tree is calculated according to formula (11):

$$c_{s,kz} = \left| \frac{\sum_{x_h \in R_{z,ks}} rss_{s,h}}{\sum_{x_s \in R_{z,ks}} (y_h - rss_{s,h})(1 - y_h + rss_{s,h})} \right|; \quad (11)$$

where $R_{s,ks}$ is a leaf node region of the $s^{th}$ regression tree; and ks represents a $k^{th}$ leaf node of the $s^{th}$ regression tree.

(S7-5) A strong learner $G_{s+1}(x_h)$ is updated according to formula (12):

$$G_{z-1}(x_h) = G_s(x_h) + \sum_{kz=1}^{K_s} c_{z,ks} I(x_h \in R_{s,ks}); \quad (12)$$

where $I(\bullet)$ is a weighted count of $x_h$ within the leaf node region; and $K_s$ is the total number of leaf nodes of the $s^{th}$ regression tree.

(S7-6) A final strong learner $G_{s+1}'(x_h)$ as the trained GBDT model based on an output $c_{s+1,ks}$ of an updated strong learner is obtained according to formula (13):

$$G_{s+1}'(x_k) = G_0(x_h) + \sum_{s=2}^{S} \sum_{k=1}^{K_s} c_{s-1,ks} I(x \in R_{s,ks}). \quad (13)$$

The step (S8) is performed through the following steps.
The leaf node number set T output by the trained GBDT model is extracted according to formula (16):

$$T = \begin{bmatrix} l_{(1,1)} & \cdots & l_{(1,s)} \\ \vdots & \ddots & \vdots \\ l_{(q,1)} & \cdots & l_{(q,s)} \end{bmatrix}_{q,S}; \quad (16)$$

where the leaf node number set T has a size of q×S; $l_{(q,s)}$ represents a serial number of a leaf node on the $s^{th}$ regression tree where an output feature of a $q^{th}$ training sample after being trained; q is the total number of training samples; and S is the total number of regression trees.

The step (S9) is performed through the following steps.

(S9-1) One-hot encoding conversion is performed on the leaf node number set T A leaf node where an output of a regression tree corresponding to a tree formed by each training sample in the training sample data set is located is marked as 1, and remaining leaf nodes are marked as 0 to obtain a sub-matrix.

(S9-2) Each training sample is subjected to sub-matrix transformation, and combined into the sparse matrix with a size of (S×$K_s$, q) where S is the total number of regression trees; $K_s$ is the total number of leaf nodes on the $s^{th}$ regression tree corresponding to the tree formed by each training sample; and q is the total number of training samples.

The step (S10) is performed through steps of:

(S10-1) Based on decomposability of a real symmetric positive definite matrix, the sparse matrix is factorized to calculate a feature latent vector of the sparse matrix.

(S10-2) A second-order polynomial model $\hat{y}(x)$ formed by combination of a linear model and a cross term is obtained according to formula (17):

$$\hat{y}(x) = \omega_0 + \sum_{u=1}^{S \times K_s} w_u x_u + \sum_{v=1}^{S \times K_s} \sum_{u=v+1}^{S \times K_s} \langle V_u, V_v \rangle x_u x_v \quad (17)$$

-continued $$\langle V_u, V_v \rangle = \sum_{l}^{d} v_{u,i} \times v_{v,i};$$

where $\omega_0$ is a bias term of the linear model; $w_u$ is a weight of a $u^{th}$ feature in the sparse matrix; $x_u$ is the $u^{th}$ feature in the sparse matrix; $x_v$ is a $v^{th}$ feature of the sparse matrix; $\langle V_u, V_v \rangle$ indicates a conversion of a coefficient of the cross term into a latent vector inner product; $V_u$ is a feature latent vector of the $u^{th}$ feature of the sparse matrix; $V_v$ is a feature latent vector of the with feature of the sparse matrix; $V_{u,l}$ is a $l^{th}$ element obtained from factorization of the $u^{th}$ feature; and $V_{v,l}$ is a $l^{th}$ element obtained from factorization of the $v^{th}$ feature.

(S10-3) The second-order polynomial model is optimized according to back propagation of a Hinge loss function in the factorization machine to obtain a prediction result.

A total set $R_k(t^*)$ of remaining signals after a $k^{th}$ decomposition in step (S4-7) is expressed as:

$$R_k(t^*) = R_{k-1}(t^*) - h_k(t^*) \quad (18);$$

where $h_k(t^*)$ is the $k^{th}$ component; $R_{k-1}(t^*)$ is a total set of remaining signals after the $(k-1)^{th}$ decomposition.

A value of the weighted count $I(x_h \in R_{s,ks})$ in step (S7-5) is expressed as:

$$I(x_h \in R_{s,ks}) = \begin{cases} 1, & \text{if } x_h \text{ is in a } ks^{th} \text{ leaf node on the } s^{th} \text{ regression tree} \\ 0, & \text{if } x_h \text{ is not in a } ks^{th} \text{ leaf node on the } s^{th} \text{ regression tree} \end{cases}.$$

In an embodiment, a high-frequency cut-off frequency of a low-pass filter is set to 40 Hz. The original vibration acceleration data set is subjected to low-pass filtering to remove the DC component. The threshold in step (S5-4) is set to 0.2 times of the maximum amplitude. The integrated feature real number set is divided into a training set and a test set in a ratio of 7:3 for model training, and the training set is divided into a GBDT model training set B and a GBDT+ factorization machine (FM) integrated training set A in a ratio of 1:1. A learning rate is 0.01. A sub-tree depth is 3. The maximum number of weak learners is 40. The GBDT model training set B is used in step (S7) for training, and the GBDT+FM integrated training set A is used in step (S8) and later to build the data model. In step (S10-3), the factorization machine performs 300 iterations, and a bivariate parameter dimension is 50.

Figure 2:
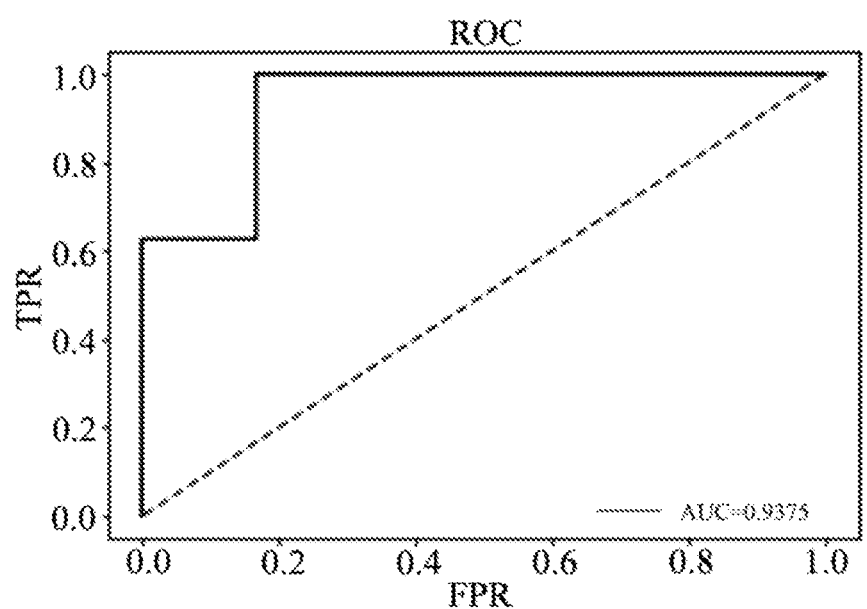
FIG. 2 is a receiver operating characteristic (ROC) curve of a gradient boosting decision tree (GBDT) and a factorization machine (FM) integrated training set A according to an embodiment of the present disclosure.
Figure 3:
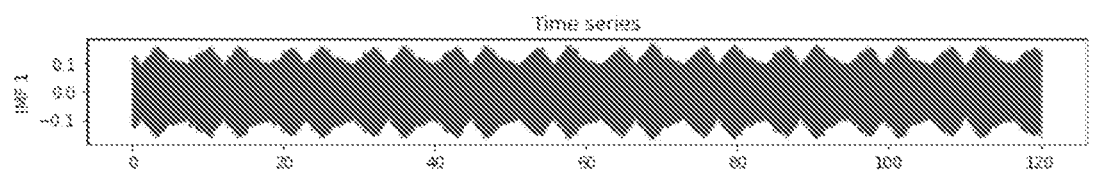
FIG. 3 shows a first component obtained from empirical mode decomposition (EMD) according to an embodiment of the present disclosure.
Figure 4:
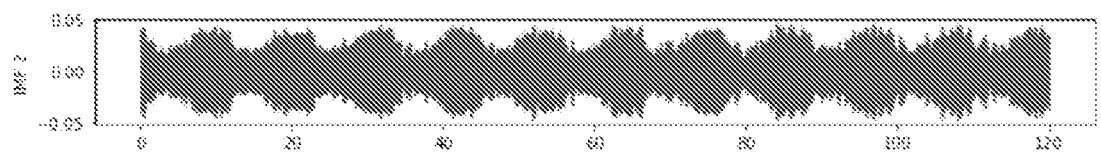
FIG. 4 shows a second component obtained from the EMD according to an embodiment of the present disclosure.
Figure 5:
FIG. 5 shows a third component obtained from the EMD according to an embodiment of the present disclosure.
Figure 6:
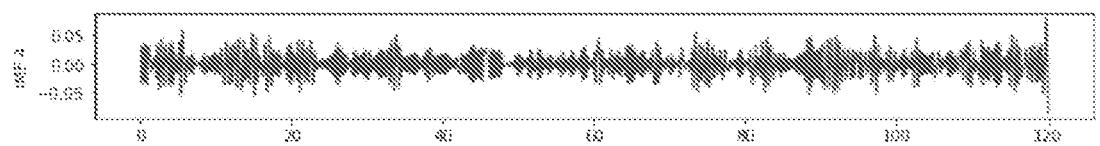
FIG. 6 shows a fourth component obtained from the EMD according to an embodiment of the present disclosure.
Figure 7:
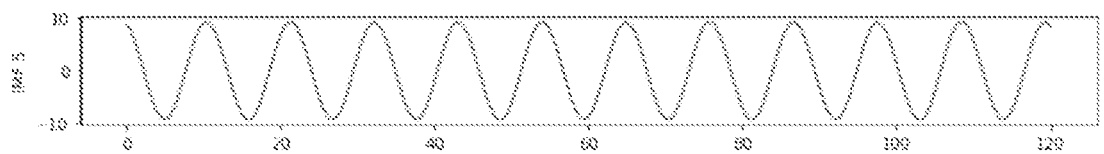
FIG. 7 shows a fifth component obtained from the EMD according to an embodiment of the present disclosure.
Figure 8:
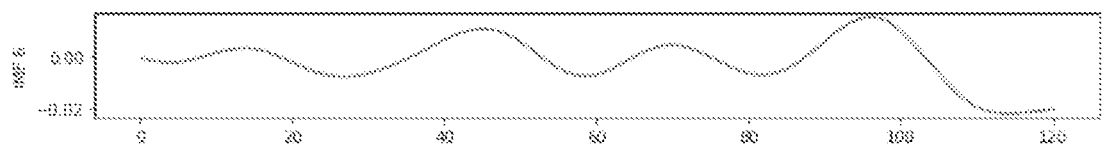
FIG. 8 shows a sixth component obtained from the EMD according to an embodiment of the present disclosure.
Figure 9:
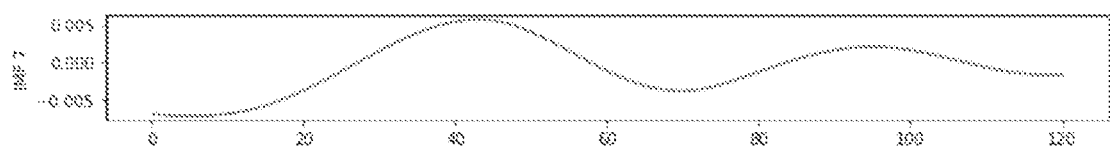
FIG. 9 shows a seventh component obtained from the EMD according to an embodiment of the present disclosure.
Figure 10:
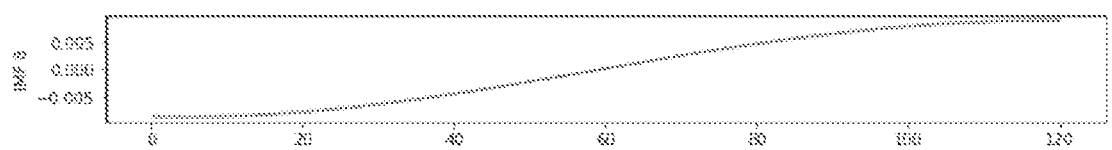
FIG. 10 shows an eighth component obtained from the EMD according to an embodiment of the present disclosure.
Figure 11:
FIG. 11 shows the rest of EMD according to an embodiment of the present disclosure.

As shown in FIG. 2, provided herein is a receiver operating characteristic (ROC) curve of the GBDT+FM integrated training set A used in step (S10); where TPR is a proportion of correctly identified positive data in the total positive data; and FPR is a proportion of predicting negative data as positive data. The test set is input into the model to be tested and predicted, and the results are analyzed. AUC (area under the ROC curve) is 0.93, which shows that the method in the present disclosure has a high prediction accuracy.

As shown in FIGS. 3-11, provided herein are the component diagrams obtained by decomposition in step (S4), where time series is the time series; IMF1-8 are the components obtained from the decomposition in an order of frequency from high to low; and Res is the remaining signals obtained from the decomposition.

Regarding the method provided herein, time domain features and frequency domain features are combined, so that the physical characteristics of original signals can be directly reflected, and the initial feature fusion can also be fully utilized to obtain reliable signal data.

Empirical mode decomposition (EMD) is adopted to de-noise and decompose the signal after the frequency domain conversion, and the selected frequency domain feature parameters can effectively represent the characteristics of the original signals and further relieve the noise interference while retaining the characteristics of original signals, so as to prepare for the next algorithm processing.

The diagnostic model involves the combination of a gradient boosting decision tree (GBDT) and a factorization machine, where by means of the GBDT, effective features can be found to obtain a local optimal solution; based on the ultra-high dimensional sparse characteristic of the factorization machine, the GBDT model is trained to obtain a global optimal solution. The combination of the two allows a higher fault resolution without manual feature selection.

What is claimed is:

1. A method for diagnosing and predicting operation conditions of large-scale equipment, comprising:
(S1) collecting a vibration signal of individual operating conditions of the large-scale equipment, and establishing an original vibration acceleration data set of the vibration signal;
(S2) de-noising the original vibration acceleration data set to obtain a de-noised vibration acceleration;
(S3) calculating a time domain parameter based on the de-noised vibration acceleration;
(S4) performing empirical mode decomposition (EMD) on the de-noised vibration acceleration to obtain a plurality of components;
(S5) calculating a frequency domain parameter based on the plurality of components;
(S6) constructing a training sample data set based on the time domain parameter and the frequency domain parameter, dividing the training sample data set into a first training subset and a second training subset;
(S7) establishing a gradient boosting decision tree (GBDT) model, and training the GBDT model with the first training subset;
(S8) extracting a leaf node number set from the trained GBDT model;
(S9) performing one-hot encoding on the leaf node number set to obtain a sparse matrix;
(S10) inputting the sparse matrix into a factorization machine to obtain a prediction result, wherein the factorization machine is trained with the second training subset; and
(S11) identifying early failure of the large-scale equipment based on the prediction result and performing maintenance on the large-scale equipment based on the identified early failure;
wherein the step (S2) comprises:
(S2-1) removing a direct-current (DC) component of a $h^{th}$ original vibration acceleration $g_{h(i)}$ in the original vibration acceleration data set according to formula (1) to obtain a $h^{th}$ first vibration acceleration $g'_{h(i)}$:

$$g'_{h(i)} = g_{h(i)} + \frac{\sum_{i=1}^{n} g_{h(i)}}{n}; \quad (1)$$

wherein n is a data length of the $h^{th}$ original vibration acceleration; and
(S2-2) removing a trend of the $h^{th}$ first vibration acceleration according to formulas (2)-(4) to obtain a $h^{th}$ de-noised vibration acceleration:

$$g''_{h(i)} = g'_{h(i)} - z; \quad (2)$$

$$z = \alpha' + \beta' t; \quad (3)$$

$$(\alpha', \beta') = \arg\min_{(\alpha,\beta)} \left[ \sum_{i=1}^{n} (\alpha + \beta t - g'_{h(i)})^2 \right]; \quad (4)$$

wherein z is the fitting trend linear function when $\alpha=\alpha'$ and $\beta=\beta'$; $\alpha$ and $\beta$ are parameters of a fitting trend linear function; $(\alpha',\beta')$ represents values of $\alpha$ and $\beta$ corresponding to a minimum value of $$\sum_{i=1}^{n} (\alpha + \beta t - g'_{h(i)})^2;$$

arg min[•] indicates minimization operation; and t represents time within a range of one sample;
a sampling time $t_i$ corresponding to the $h^{th}$ de-noised vibration acceleration is expressed as:

$$t_i = e + f \times i \quad i \leq n \quad (5);$$

wherein i is an integer starting from 0 for numbering each element in the training sample data set, e is an origin time of vibration acceleration; and f is a sampling frequency;
in step (S3), the time domain parameter comprises an effective value, kurtosis, variance and crest factor of the de-noised vibration acceleration;
the step (S5) comprises:
(S5-1) obtaining an energy value $P_k$ of a $k^{th}$ component according to formula (6):

$$P_k = \sum_{\xi=1}^{N_1} h_k^2(t^*) \times dT; \quad (6)$$

wherein $N_1$ is the total number of discrete data points in the $k^{th}$ component $h_k(t^*)$; dT represents a sampling frequency; and $i_1$ represents a serial number of the discrete data points in the $k^{th}$ component $h_k(t^*)$;
(S5-2) sorting energy values of the plurality of components;
selecting X components with the largest energy value; and
subjecting the X components to fast Fourier transform to obtain X initial spectra;
(S5-3) extracting a maximum amplitude $P_0^X$ of each of the X initial spectra;
(S5-4) setting a threshold; and
selecting frequencies respectively corresponding to an amplitude higher than the threshold to establish X frequency-amplitude data sets;
(S5-5) calculating an average amplitude $P_1^X$ of the X frequency-amplitude data sets according to formula (7):

$$P_1^X = \frac{\sum_{i_2=1}^{N_2} |f_{i_2}|}{N_2} \quad N_2 \leq N_1; \tag{7}$$

wherein $N_2$ is the number of selected frequencies; and $f_{i_2}$ is an amplitude corresponding to a $i_2^{th}$ frequency;

(S5-6) calculating a root mean square value $P_2^X$ of the X frequency-amplitude data sets according to formula (8):

$$P_2^X = \sqrt{\frac{\sum_{i_2=1}^{N_2} |f_{i_2}^2|}{4\pi^2 f_{i_2}^2}}; \tag{8}$$

wherein $\pi$ represents a 180-degree angle; and (S5-7) selecting a frequency $P_3^X$ corresponding to a maximum amplitude in the X frequency-amplitude data sets;

in step (S7), the GBDT model is established through steps of:

(S7-1) initializing a first weak learner $G_0(D)$ according to formula (9):

$$G_0(D) = \log \frac{P(y_k = 0 | D)}{1 - P(y_k = 0 | D)} \quad h \in \{1, \ldots, q\}; \tag{9}$$

wherein $P(y_h=0|D)$ represents a probability that a $h^{th}$ tagged value $y_h$ in the training sample data set D is marked as 0 in an integrated feature real number set; and log is a base-10 logarithmic function;

(S7-2) establishing S trees, and calculating a pseudo-residual $rss_{s,h}$ of a $s^{th}$ tree $G'_s(x_h)$ by using a log-likelihood function, expressed as:

$$YSS_{s,h} = y_h - \frac{1}{1 + e^{-G'_s(x_h)}} \quad s \in \{0, 1, \ldots S-1\}; \tag{10}$$

wherein $x_h$ is a $h^{th}$ integrated feature real number in the training sample data set D; and e represents natural logarithm;

(S7-3) fitting data $(x_h, rss_{s,h})$ using a classification and regression tree (Cart) to obtain a $s^{th}$ regression tree $G_s(x_h)$ as a $s^{th}$ weak learner;

(S7-4) calculating an optimal negative gradient fitted value $c_{s,ks}$ of each leaf node in the $s^{th}$ regression tree according to formula (11):

$$c_{s,ks} = \left| \frac{\sum_{x_k \in R_{s,ks}} rss_{s,h}}{\sum_{x_j \in R_{s,ks}} (y_k - rss_{s,h})(1 - y_h + rss_{s,h})} \right|; \tag{11}$$

wherein $R_{s,ks}$ is a leaf node region of the $s^{th}$ regression tree; and ks represents a $k^{th}$ leaf node of the $s^{th}$ regression tree;

(S7-5) updating a strong learner $G_{s+1}(x_h)$ according to formula (12):

$$G_{s+1}(x_h) = G_s(x_h) + \sum_{ks=1}^{K_s} c_{z,ks} I(x_k \in R_{s,ks}); \tag{12}$$

wherein $I(\cdot)$ is a weighted count of $x_h$ within the leaf node region; and $K_s$ is the total number of leaf nodes of the $s^{th}$ regression tree; and (S7-6) obtaining a final strong learner $G_{s+1}'(x_{in})$ as the trained GBDT model based on an output $c_{s+1,ks}$ of an updated strong learner according to formula (13):

$$G'_{s+1}(x_k) = G_0(x_h) + \sum_{s=2}^{S} \sum_{k=1}^{K_s} c_{s-1,ks} I(x \in R_{s,ks}). \tag{13}$$

2. The method of claim 1, wherein the step (S4) is performed through steps of:

(S4-1) finding all extreme points of the de-noised vibration acceleration through a find_peaks function; wherein the find_peaks function is configured to find peaks;

(S4-2) connecting local maximum points $m_{up}$ in all extreme points into an upper envelope $n_{up}$, and connecting local minimum points $m_{down}$ in all the extreme points into a lower envelope $n_{down}$ through a cubic spline curve, expressed as follows:

$$n_{up} = a_{up} + b_{up} m_{up} + c_{up} m_{up}^2 + d_{up} m_{up}^3 \quad up \leq n$$

$$n_{down} = a_{down} + b_{down} m_{down} + c_{down} m_{down}^2 + d_{down} m_{down}^3 \quad down \leq n \tag{14}$$

wherein $a_{up}$, $b_{up}$, $c_{up}$ and $d_{up}$ are coefficients of the upper envelope; and $a_{down}$, $b_{down}$, $c_{down}$ and $d_{down}$ are coefficients of the lower envelope;

(S4-3) determining the coefficients of the upper envelope and the coefficients of the lower envelope based on all extreme points of the de-noised vibration acceleration through an interpolation algorithm;

(S4-4) obtaining a component to be judged $h_1(t^*)$ at moment $t^*$ according to formula (15):

$$m_1(t^*) = \frac{n_{sp} + n_{down}}{2} \tag{15}$$

$$h_1(t^*) = g''_h(t^*) - m_1(t^*);$$

wherein $m_1(t^*)$ is an average value of the upper envelope and the lower envelope at the moment $t^*$; and $g''_h(t^*)$ is a time domain expression of a $h^{th}$ de-noised vibration acceleration;

(S4-5) determining whether $h_1(t^*)$ satisfies an intrinsic mode function;

if yes, taking $h_1(t^*)$ as a first component of the $h^{th}$ de-noised vibration acceleration, and proceeding to step (S4-6);

otherwise, taking $h_1(t^*)$ as an input signal, and repeating steps (S4-1)-(S4-5) until $h_1(t^*)$ satisfies the intrinsic mode function, and proceeding to step (S4-6);

(S4-6) obtaining a total set $R_1(t^*)$ of remaining signals after a first decomposition according to formula (16):

$$R_1(t^*) = g_h^*(t^*) - h_1(t^*) \tag{16}; \text{ and}$$

(S4-7) repeating steps (S4-1)-(S4-6) based on the total set of remaining signals to obtain the $k^{th}$ component $h_k(t^*)$.

3. The method of claim 1, wherein the step (S6) is performed through steps of:
(S6-1) combining the frequency domain parameter into a frequency-domain feature real number set $x_2^h = \{P_0^X, P_1^X, P_2^X, P_3^X\}_h$, and forming the integrated feature real number set $x_h = \{x_1^h, x_2^h\}$ in combination with the time domain parameter; wherein h is a $h^{th}$ data in the original vibration acceleration data set; and $x_1^h$ is a time domain feature real number set; and
(S6-2) tagging the integrated feature real number set to obtain the training sample data set D expressed as: $D = \{(x_1, y_1), (x_2, y_2), \ldots (x_q, y_q)\}$;
wherein q represents the total amount of data in the original vibration acceleration data set; $y_q$ is a tagged value, and $y_q \in \{0,1\}$; $y_q = 0$ indicates that data in the integrated feature real number set is in a normal operating state; and $y_q = 1$ indicates that the data in the integrated feature real number set is in an abnormal operating state.

4. The method of claim 1, wherein the step (S8) is performed through steps of:
extracting the leaf node number set T output by the trained GBDT model according to formula (16):

$$T = \begin{bmatrix} l_{(1,1)} & \cdots & l_{(1,t)} \\ \vdots & \ddots & \vdots \\ l_{(q,1)} & \cdots & l_{(q,t)} \end{bmatrix}_{q,S} ;$$ (16)

wherein the leaf node number set T has a size of q×S; $l_{(q,s)}$ represents a serial number of a leaf node on the $s^{th}$ regression tree where an output feature of a $q^{th}$ training sample after being trained; q is the total number of training samples; and S is the total number of regression trees.

5. The method of claim 4, wherein the step (S9) is performed through steps of:
(S9-1) performing one-hot encoding conversion on the leaf node number set T;
marking a leaf node where an output of a regression tree corresponding to a tree formed by each training sample in the training sample data set is located as 1, and marking remaining leaf nodes as 0 to obtain a sub-matrix; and (S9-2) subjecting each training sample to sub-matrix transformation followed by combining into the sparse matrix with a size of (S×$K_s$,q); wherein S is the total number of regression trees; $K_s$ is the total number of leaf nodes on the $s^{th}$ regression tree corresponding to the tree formed by each training sample; and q is the total number of training samples.

6. The method of claim 5, wherein the step (S10) is performed through steps of:
(S10-1) based on decomposability of a real symmetric positive definite matrix, factorizing the sparse matrix to calculate a feature latent vector of the sparse matrix;
(S10-2) obtaining a second-order polynomial model $\hat{y}(x)$ formed by combination of a linear model and a cross term according to formula (17):

$$\hat{y}(x) = \omega_0 + \sum_{u=1}^{S \times K_s} w_u x_u + \sum_{v=1}^{S \times K_z} \sum_{u=v=1}^{S \times K_z} \langle V_u, V_v \rangle x_u x_v$$ (17)

$$\langle V_u, V_v \rangle = \sum_{l}^{d} v_{u,l} \times v_{v,l}$$

wherein $\omega_0$ is a bias term of the linear model; $w_u$ is a weight of a $u^{th}$ feature in the sparse matrix; $x_u$ is the $u^{th}$ feature in the sparse matrix; $x_v$ is a $v^{th}$ feature of the sparse matrix; $\langle V_u, V_v \rangle$ indicates conversion of a coefficient of the cross term into a latent vector inner product; $V_u$ is a feature latent vector of the $u^{th}$ feature of the sparse matrix; $V_v$ is a feature latent vector of the $v^{th}$ feature of the sparse matrix; $V_{u,l}$ is a $l^{th}$ element obtained from factorization of the $u^{th}$ feature; and $V_{v,l}$ is a $l^{th}$ element obtained from factorization of the $v^{th}$ feature; and (S10-3) optimizing the second-order polynomial model according to back propagation of a Hinge loss function in the factorization machine to obtain a prediction result.

* * * * *